United States Patent [19]

De La Cierva

[11] 4,450,480

[45] May 22, 1984

[54] SYNCHRONIZATION INTERFACE DEVICE FOR AUTONOMUS VIDEO EQUIPMENT

[75] Inventor: Juan De La Cierva, Key Biscayne, Fla.

[73] Assignee: Scitech Corporation, Miami, Fla.

[21] Appl. No.: 365,786

[22] Filed: Apr. 5, 1982

[51] Int. Cl.³ .............................................. H04N 5/04
[52] U.S. Cl. ................................................ 358/149
[58] Field of Search ........................ 358/148, 149, 183

[56] References Cited

U.S. PATENT DOCUMENTS 4,306,250 12/1981 Summers et al. .................... 358/148
4,346,407 8/1982 Baer et al. ............................ 358/148

Primary Examiner—John C. Martin
Assistant Examiner—E. A. McDowell
Attorney, Agent, or Firm—Jesus Sanchelima

[57] ABSTRACT

A synchronization interface device to be used in conjunction with equipment with its own internally generated synchronization signal to allow harmonization with other external video signals from other devices to facilitate the manipulation of these signals, including means for separating the odd field from the internal and external signals and gate means producing a unique output state when both signals are in synchronization and a different output inhibiting the passage of the internally generated horizontal drive to means for comparing it against the external horizontal component so that the output from this comparison is fed to voltage oscillator means which produces an output in the 14 MHz range that is fed back to the slave equipment (AVE). If the gate means do not produce the unique output, the device experiences a drift until it locks in synchronization.

4 Claims, 6 Drawing Figures

FIG-2-

TIMING CHART
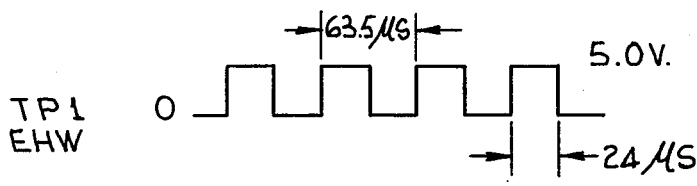
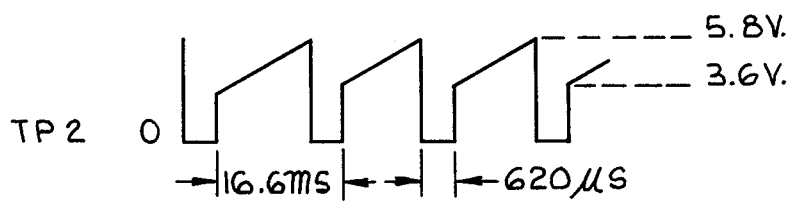
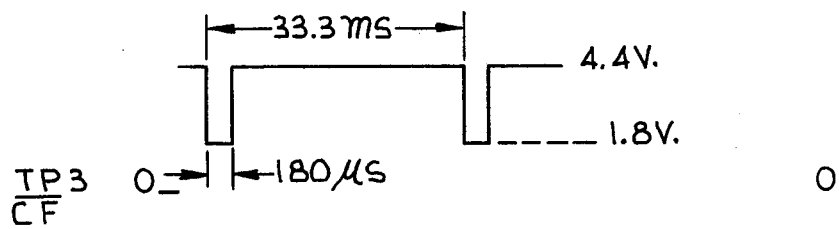
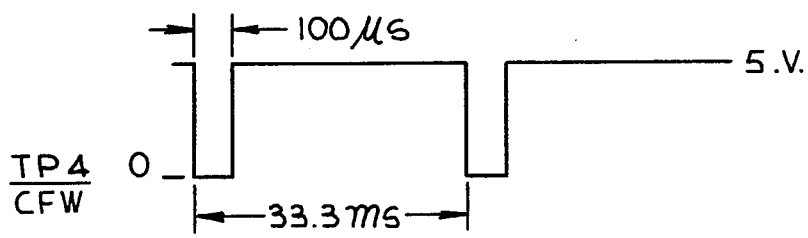
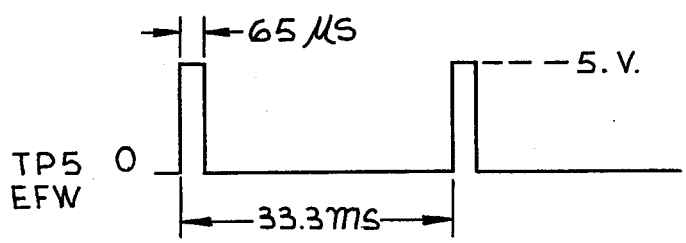
Fig. 6.

SYNCHRONIZATION INTERFACE DEVICE FOR AUTONOMUS VIDEO EQUIPMENT

BACKGROUND OF THE INVENTION

1. Field of the Invention

The present invention relates to a synchronization interface device, and more particularly, to a signal synchronization device for equipment with its own internally generated synchronization signal, including television cameras, computers, video tape recorders, and other video equipment.

2. Description of the Prior Art

The typical low-cost consumer video equipment having its own autonomous or internally generated synchronization signal, hereinafter referred to as autonomous video equipment, or AVE, is not provided with the required circuitry for using externally supplied signals, such as, horizontal, vertical, and color carriers and subcarriers as in the professional equipment. This feature is necessary in order to provide the user with capabilities for manipulating (mixing, adding, subtracting, or in any way combining) the signals coming from other video sources, whether characterized as an AVE or not. Expensive professional equipment is required to generate the above-referenced external signals, and, furthermore, the consumer equipment in the market is not capable of receiving these signals even if they are made available to the user. Nowhere in the marketplace or technical literature available has there been a disclosure or suggestion of the existence of a simple interface device like the one disclosed and claimed herein.

SUMMARY OF THE INVENTION

It is the main object of the present invention to provide an interface device capable of synchronizing externally supplied video signals with video signals from AVE's so that the AVE signals may be merged with those of the external source to provide flexibility in the manipulation of the video signals.

It is another object of the present invention to provide a single signal derived from the AVE and processed by the present invention so that it can be easily injected back into the AVE being driven in complete synchronization with the driving external video source equipment.

It is yet another object of the present invention to provide a device that is capable of using an externally supplied video black and white signal to synchronize color AVE's.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
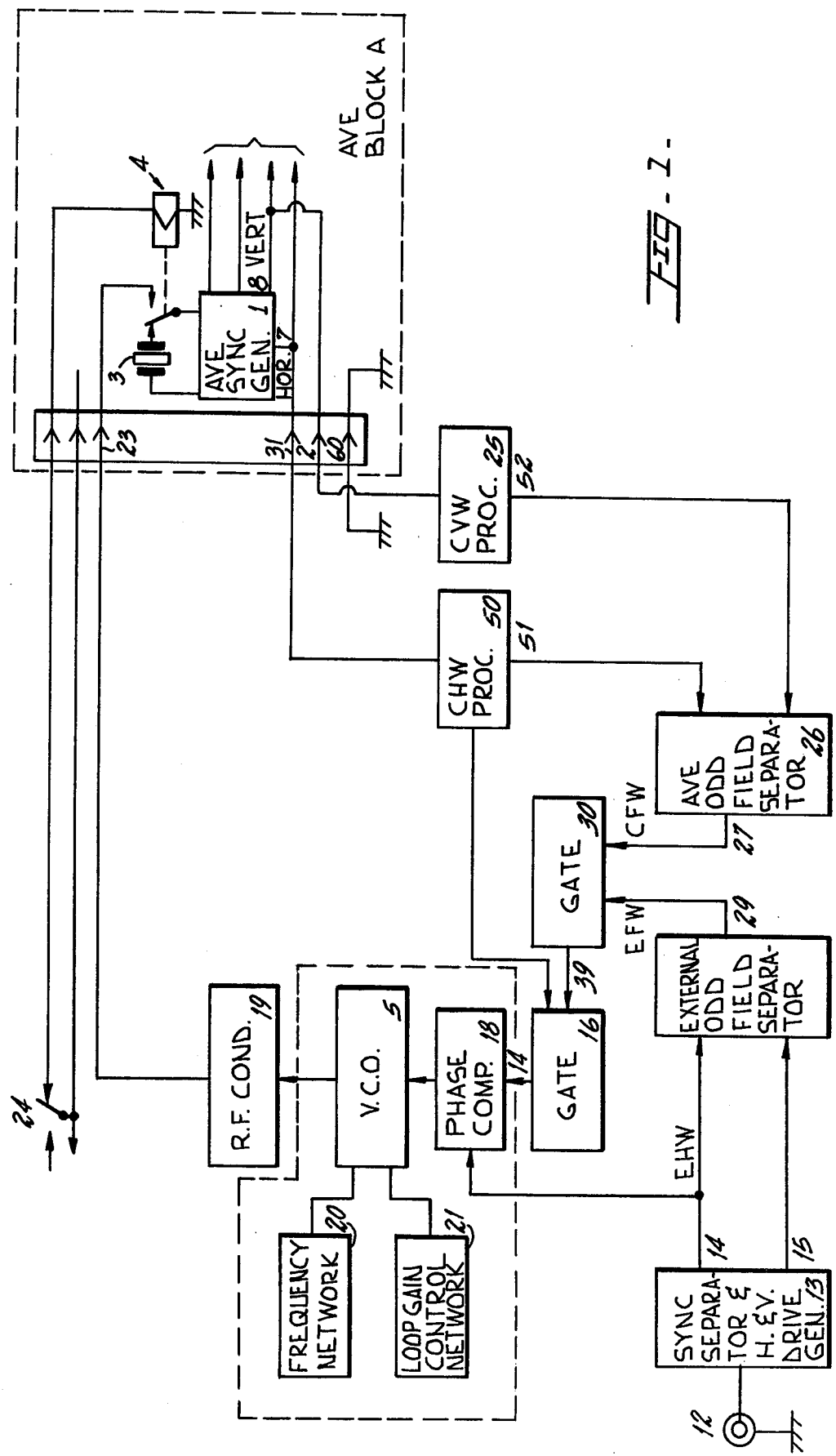
FIG. 1 represents a diagram showing the circuit elements in block form for easy overall understanding of the invention.

Referring now to FIG. 1, where the present invention has been represented in block schematic, it can be observed that the interface device is referred to generally by numeral 10. The components inside block A correspond to those already existing in commercially available AVE's.

In general, the invention has two circuits for locking the horizontal and vertical components of the externally supplied video signal to the signal generated by the AVE which is processed by device 10 and injected back to the AVE. The horizontal circuit is inhibited by disabling CHW gate 16 until vertical synchronization is achieved and the proper logic level appears at output 39 of vertical lock gate 30. Device 10 substitutes quartz crystal 3 normally found in AVE's which is tuned to 14.31818 MHz and this frequency is divided to provide the color subcarrier frequency of 3.579545 KHz, the horizontal drive frequency of 15.734263 KHz, and the 59.9400 Hz for the vertical drive. Device 10 takes the AVE's horizontal drive signal and compares it to the externally supplied signal EXT, producing the above referenced 14 MHz signal through a voltage control oscillator circuit 5, as shown in FIG. 1. Of course, to have synchronization on a particular line reference, vertical synchronization is achieved by detecting the odd field of the scan.

Basically, a minor modification needs to be made in the driven AVE to inject the processed signals into it, namely, the input connection 2 of the AVE internal synchronization signal generator 1 which comes from quartz crystal 3 is interrupted so that it can be bypassed with relay 4. Any suitable switch means may be utilized instead of using a relay, i.e. analog switches, manual single pole double throw switches, non-inverting gate, etc. The function of relay 4 is to bypass the crystal-controlled oscillator input signal and replace it with the signal generated by the interface device 10 through pin 23 of connector 6. Relay 4 is controlled by switch selector switch 24 which is basically a single pole, double throw switch that uses the Vcc of the AVE to activate the coil of relay 4 and to feed the other circuits of interface device 10. Relay 4 may also be substituted with a manual single pole double throw switch but it is believed that using a relay or an analog switch will keep parasytic reactance and noise interference at a minimum.

Outputs 7 and 8 of AVE synchronizing generator 1 corresponding to horizontal and vertical drive signals, respectively, are tapped and fed to pins 31 and 2 of connector 6. The ground level of the AVE is commonly connected to the ground level of interface device 10, through pin 60 of connector 6 and mating AVE connector 6'.

Figure 2:
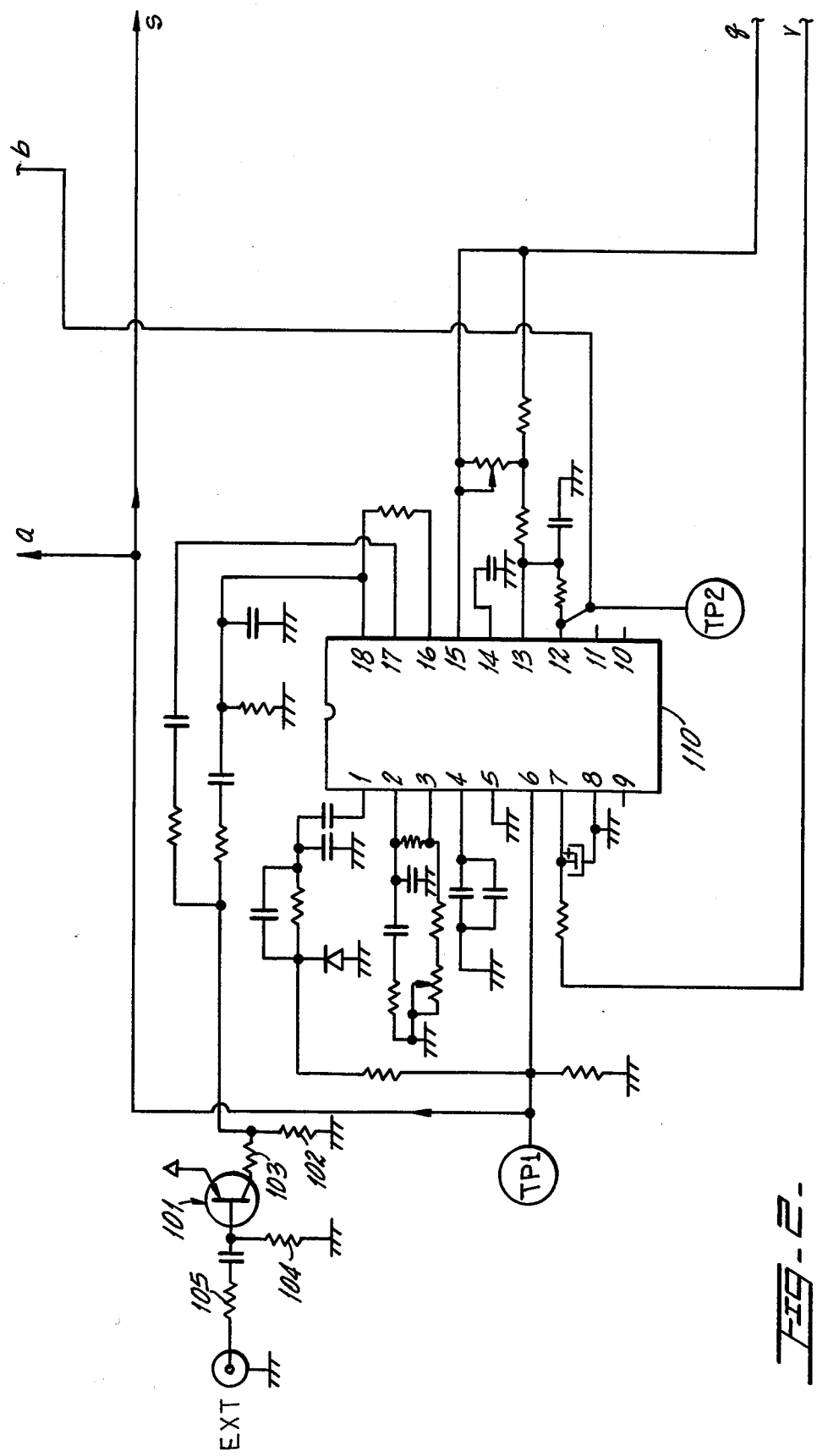
FIGS. 2, 3, 4, and 5 represent a schematic diagram showing the preferred embodiment of the invention in more detail.

External video jack 12 is adapted to inject into interface device 10 a standard signal, such as NTSC (National Television Standard Committee), PAL (Phase Alternating Line), SECAM (Systeme en couleurs a memoire) or any other suitable composite video signal. This external signal EXT is used as the synchronization reference in conjunction with the signal coming from the driven AVE. Signal EXT may also come from another AVE. It is important to note that even a black and white video signal may be used to synchronize a color device, i.e., camera, video tape recorder, etc. Signal EXT is then processed by Synchronizing Signal Separator and Horizontal and Vertical Drive Generator Circuit 13 which extracts its horizontal and vertical video components, using them to trigger continuously running pulses, EHW and EVW, on output ports 14 and 15, which are locked in frequency and phase with EXT signal composite video sync components. Specifically, referring to FIG. 2, it can be seen that transistor 101 is biased so that it transmits only the synchronizing signal, the horizontal and vertical components, extracted from the above-referenced external signal EXT and blocking the video information. In the preferred embodiment, transistor 101 is a 2N3906, resistors 102, 103, 104 and 105 have values of 1.0, 1.8, 330 and 0.150 K-Ohms, respectively. The resulting signal is passed through an RC filtering and time-delaying network and fed to integrated circuit 110, which, in the preferred embodiment corresponds to an AN 5435, manufactured by Panasonic. The output from IC 110 corresponds to the above-referenced continuously running pulses EHW and EVW which have a predetermined pulse width. Timing chart details are shown in FIG. 6 illustrating EHW and EVW at test points 1 and 2, respectively.

Figure 3:
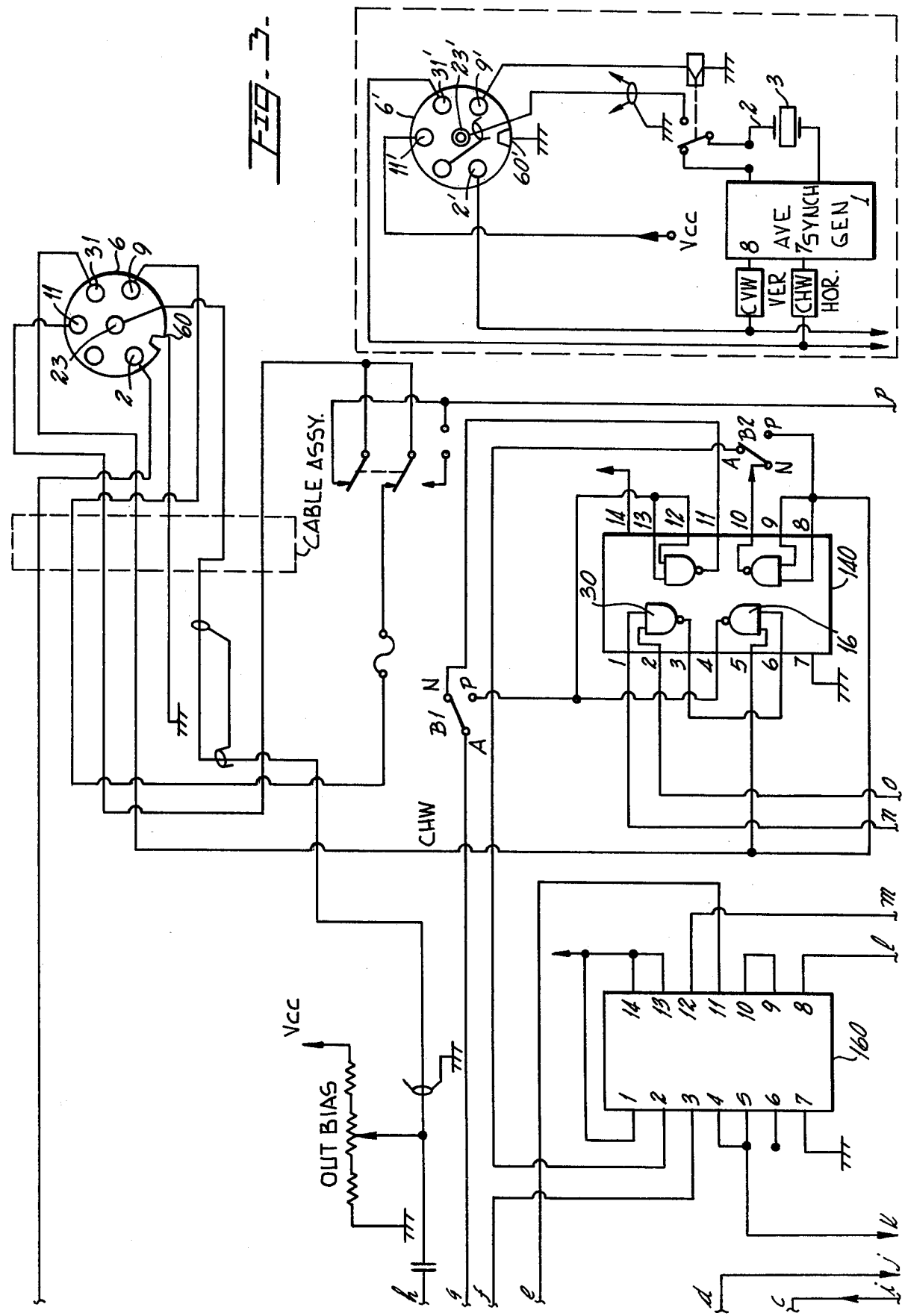

Going back to FIG. 1, the AVE vertical drive signal appearing on output 8 is fed to CVW Processor Circuit 25 which basically harmonizes the amplitude of the signals from different AVE manufacturers with the logic voltage levels of interface device 10. Similarly, the horizontal drive signal on output 7 is processed by CHW Processor Circuit 50. In the Preferred embodiment, Quad Comparator IC 150, like LM-339, is used to process signal CVW. In FIG. 3, it can be observed that the output pin 2 of connector 6, corresponding to the vertical drive signal CVW, is connected to input pin 4 of one of the comparators of IC 150. The output from pin 2 is then fed to clock input pin 3 of IC 160 which is a Dual D Flip Flop, 74LS74, and acts as an odd field separator.

Figure 4:
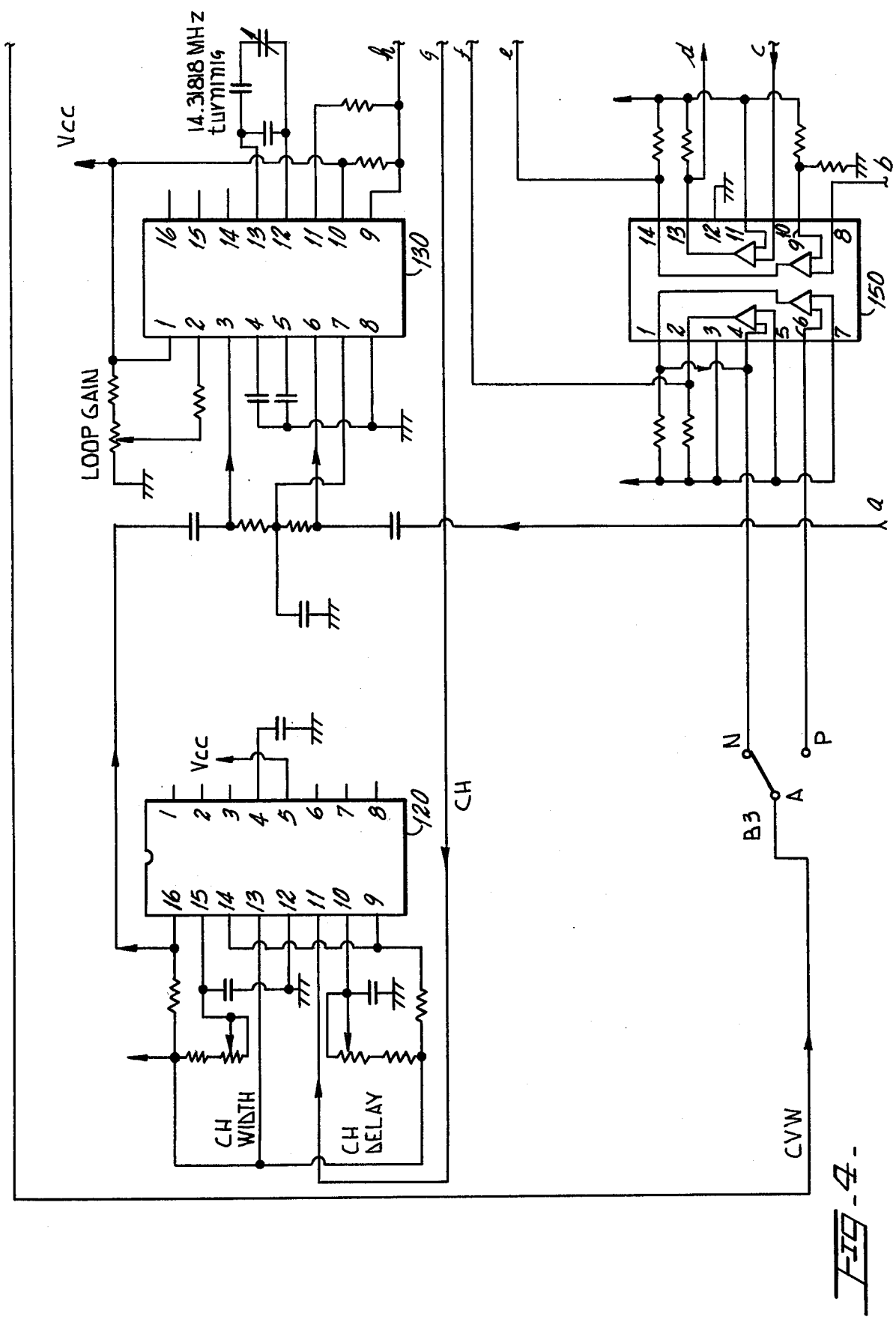

Signal CHW is processed differently, as it can be seen from FIG. 3, output pin 31 of connector 6 is connected to inputs 5 and 9 of two of the NAND gates of IC 140 which is a Quad 2-Input NAND gate, CD4011. Gate inputs 8 and 9 are connected to input Data 1 of IC 160 and this signal is provided with a bridge B2 to allow the installer to set it depending on the AVE manufacturer's design. IC 160 will then use the signal inputs at Data 1 pin 2 (processed CHW) and at Clock 1 pin 3 (processed CVW) to separate the even field scans, providing a signal at output Q pin 5 as shown in test point TP3 in FIG. 4. The pulse width of the input signal shown at TP3 is then set to about 620 microseconds as shown in TP4 after being processed by IC 170 which is a timer, LM-555. Its output CFW is then fed to input pin 2 of IC 140 which corresponds to gate 30 in FIG. 1, a Vlock signal in low level state appears on pin 3 of IC 140 in FIG. 3, or output 39 of FIG. 1, when both, pins 1 and 2 of IC 140 are high. As it can be seen from TP4, CFW at pin 2 will be high during the whole period of 33.33 milliseconds except for 620 microseconds, which corresponds to the first line of the odd field. The reason for this pulse width for CFW of 620 microseconds is that IC 110 provides this output pulse width but the value is not critical as long as it is larger than 65 microseconds which corresponds to one line and that is the width for EFW. EFW is the external source equivalent to CFW. EFW comes from output pin 8 of IC 160 after being buffered by a comparator in IC 150.

Gate 16 in FIG. 1 will be closed when EFW and CFW signals are not synchronized, resulting in a low level at output 3 of IC 140. The gate output pin 4 is connected to input trigger B pin 11 of IC 120 which is a Quad Timer, NE558. This output pin may or may not be inverted by selecting connection AN or AP on bridge B1, depending on who the manufacturer of the AVE is, i.e., the AN connection would be used, as shown in the preferred embodiment, for Sony's Camer Model AN728 model and the AP connection for Mashusita's MN 6064 model.

The horizontal drive signal appearing on pin 31 of connector 6 is processed by CHW Processor Circuit 50 and its output 51 is then fed to AVE Odd Field Separator Circuit 21. Similarly, the vertical drive signal appearing on pin 2 of connector 6 is processed by CVW processor circuit 25 and its output at 52 is then fed to AVE Odd Field Separator Circuit 26. The odd field of each AVE scan frame is isolated to produce a pulse, CFW at output 27, for each AVE odd scan field. Similarly, the above mentioned signals EHW and EVW are fed to External Video Odd Field Separator Circuit 28, to obtain a pulse, EFW at output 29, for each external video odd field. The two pulses, EFW and CFW, are then fed to Gate Circuit 30. The function of Vertical Circuit 30 is to provide a signal Vlock at output 39 which is fed with CHW signal to Gate Circuit 16, causing it to be either in closed or open status. In this manner, when the two odd fields from the AVE and the External video signal are not synchronized, Gate Circuit 16 is closed more frequently than if the signals were synchronized and Phase Comparator Circuit 18 receives a gated CHW signal from output 14, in FIG. 1, that continuously loses a number of pulses during each scan frame. Hence, having a closed gate status is equivalent to lowering the average frequency of the gated CHW signal, as it is seen by Phase Comparator Circuit 18.

The output voltage of Phase Comparator Circuit 18 is fed to Voltage Controlled Oscillator 5. Consequently, the output frequency of the Voltage Controlled Oscillator Circuit 5 decreases compared with its value when the Gate 16 is open (full synchronization). This produces a drift of the pulses generated by the AVE, that continues until the CFW and EFW pulses are in full synchronization. This operation condition is referred to as "genlock status," and stands for full and complete synchronization of the External Video and the AVE signals. Pulse Signal EFW and gated processed signal CHW are then compared in Phase Comparator Circuit 18. The output of the Phase Comparator Circuit 18 is then fed to Voltage Controlled Oscillator 5 that oscillates at a frequency determined by Free Running Frequency Network 20. The free running frequency is selected to be approximately the frequency of the AVE quartz crystal oscillator when the AVE operates normally in its unmodified or internal sync condition.

Loop Gain Control Circuit 21 associated with Voltage Controlled Oscillator Circuit 5 is of conventional design and intended to control the gain of the resultant frequency determining loop. The radio frequency generated by the Voltage Controlled Oscillator Circuit 5 is then processed by an RF output conditioning circuit, in order to make it compatible with the AVE sync generator 1 through pin 23 of connector 6. Sync Selector Switch 24 is used to energize the coil of relay 4. The supply voltage Vcc from the AVE being driven is also used to feed other circuits of interface device 10.

The output A, pin 16, of one of the quad timers, IC 120 is then fed to phase locked loop comparator and 14

MHz generator IC 130, on pin 3. The output from pin 9 is then fed back to the AVE through pin 23 of connector 6.

Figure 5:
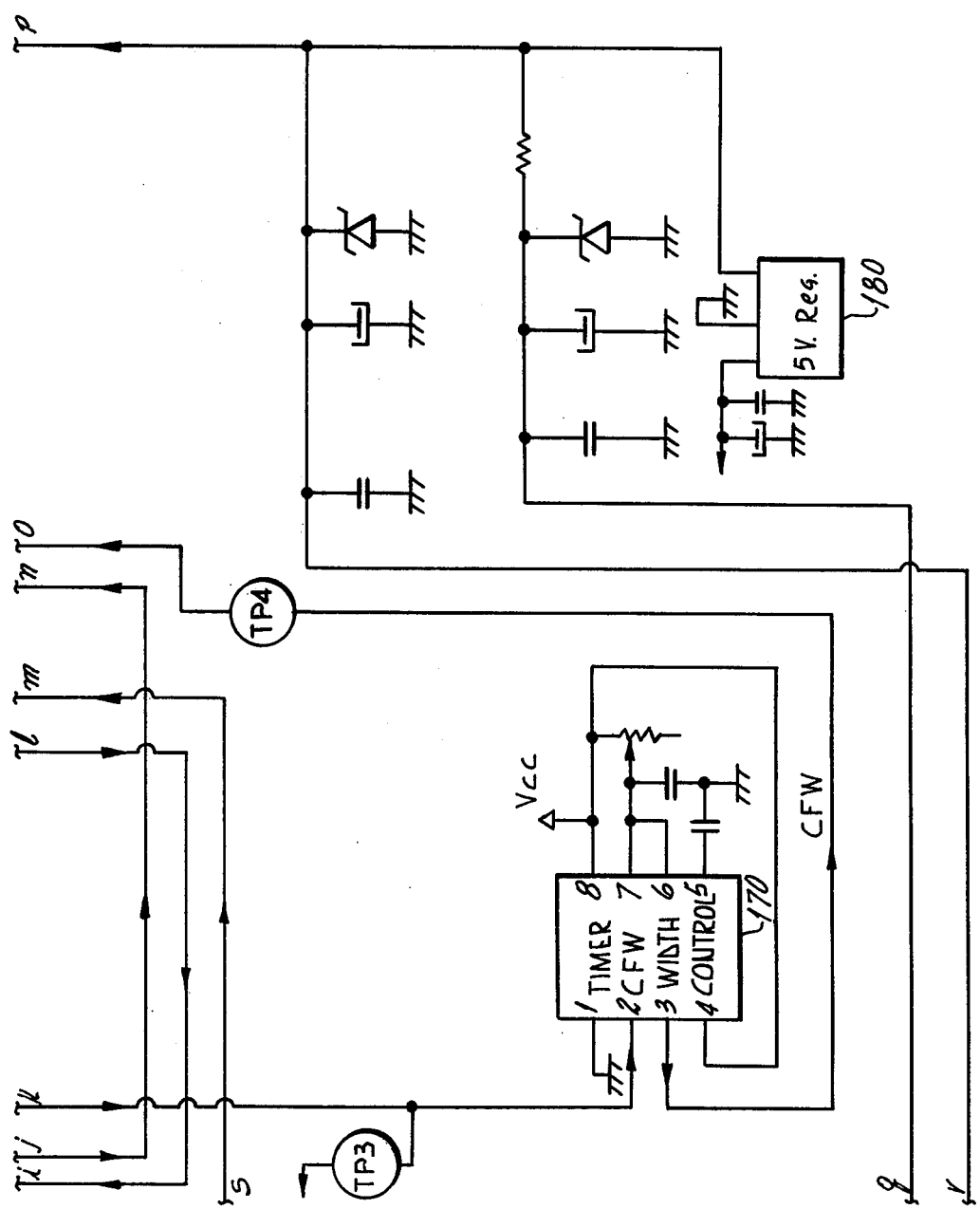

The 12 volts D.C. supply from the AVE is utilized by device 10 to provide the three voltages required according to the preferred embodiment implementation, as it can be seen from FIGS. 3 and 5. IC 180, which is a 5 volt regulator, LM 7805, and zener diodes ZD1 and ZD2 are used to provide Vcc (5 volts), 9.2 volts and 11.0 volts, respectively, in a conventional manner.

It is believed the foregoing description conveys the best understanding of the objects and advantages of the present invention. Different embodiments may be made of the inventive concept of this invention. It is to be understood that all matter disclosed herein is to be interpreted merely as illustrative, and not in a limiting sense, except as set forth in the following appended claims.

What is claimed is:

1. An interface device to be used in conjunction with an external video signal to synchronize and manipulate the video signals from video equipment provided with built-in generators of internal synchronization signals including horizontal and vertical drive signals, comprising, in operative combination:
   (A) switch means for bypassing the crystal input to said generator;
   (B) means for separating the horizontal and vertical sync components from said external video signal, including two generators of continuously running pulses triggered by said horizontal and vertical sync components;
   (C) means for separating the odd field of each of said internal video signal scan frame connected to the horizontal and vertical drive signals of said built-in generator;
   (D) means for separating the odd field of each of said external video signal scan frame connected to the output of said two generators of continuously running pulses;
   (E) first means for gating having its two inputs connected to the outputs of said means for separating the odd fields of said external and internal video signal scan frame thereby causing the output of said first gating means to be at a predetermined state when the external and internal video signals are in synchronization;
   (F) second means for gating having one of its two inputs connected to the output of said first means for gating and the other input being connected to the horizontal drive signal of said built-in generator;
   (G) phase comparator means having one of its two inputs connected to the output of said second means for gating and the other input being connected to the output of said generator of continuously running pulses triggered by the external horizontal sync component;
   (H) voltage controlled oscillator means driven by the output of said phase comparator means and having its output connected to said switch means for bypassing the crystal of said built-in generator.

2. The device set forth in claim 1 further comprising:
   (I) radio frequency conditioning means having its input connected to the output of said voltage controlled oscillator and its output connected to said switch means for bypassing the crystal of said built-in generator.

3. The device set forth in claim 2 further comprising:
   (J) means for processing said horizontal and vertical drive signals of said built-in generators so that its amplitude and pulse widths are compatible with the other circuits.

4. The device set forth in claim 3 wherein said voltage controlled oscillator means further includes loop gain control means.

* * * * *